Patented Dec. 5, 1944

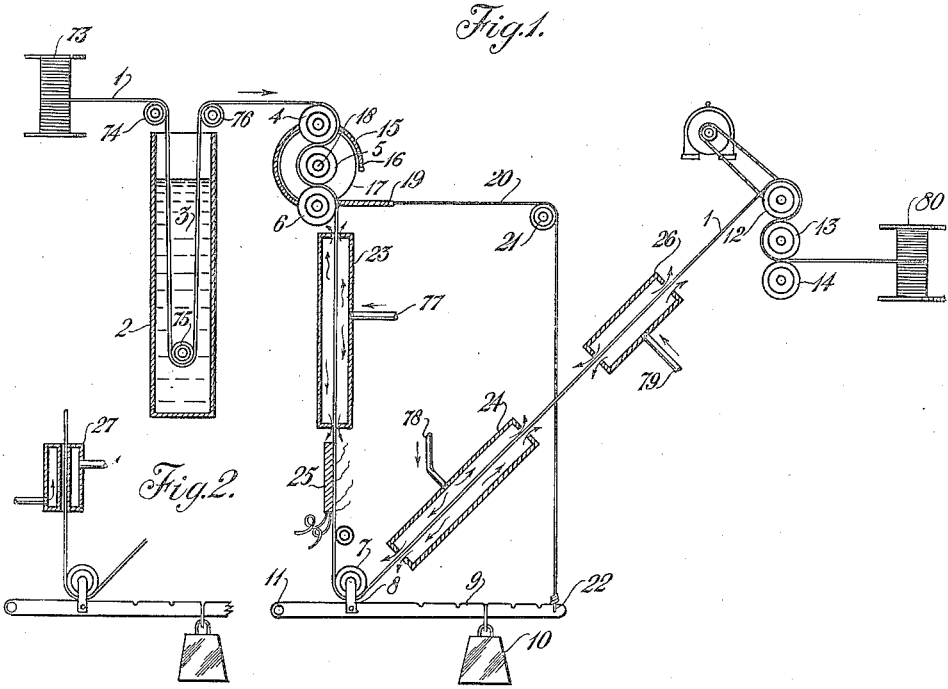
Fig. 1.
Fig. 2.
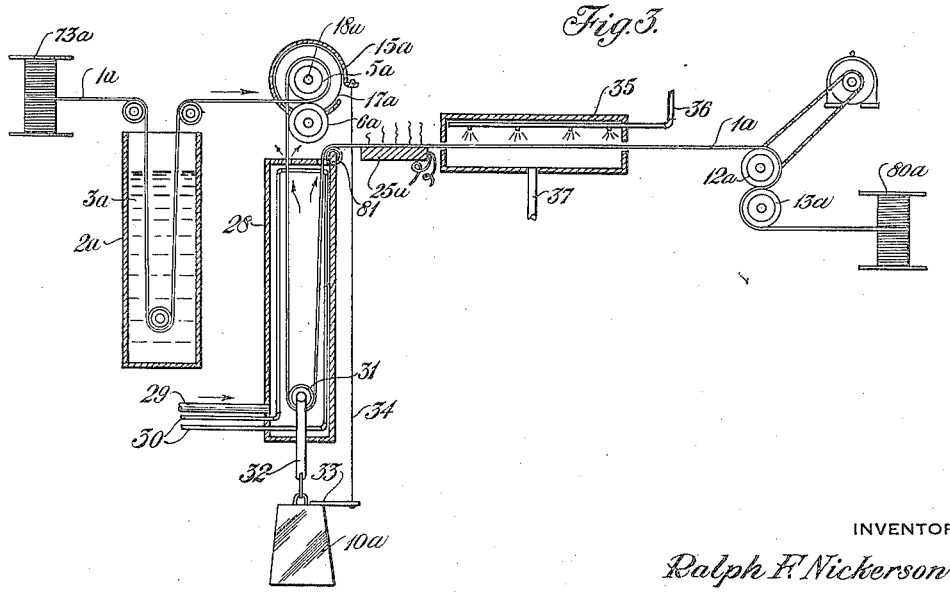
Fig. 3.
INVENTOR
Ralph F. Nickerson
BY
ATTORNEYS

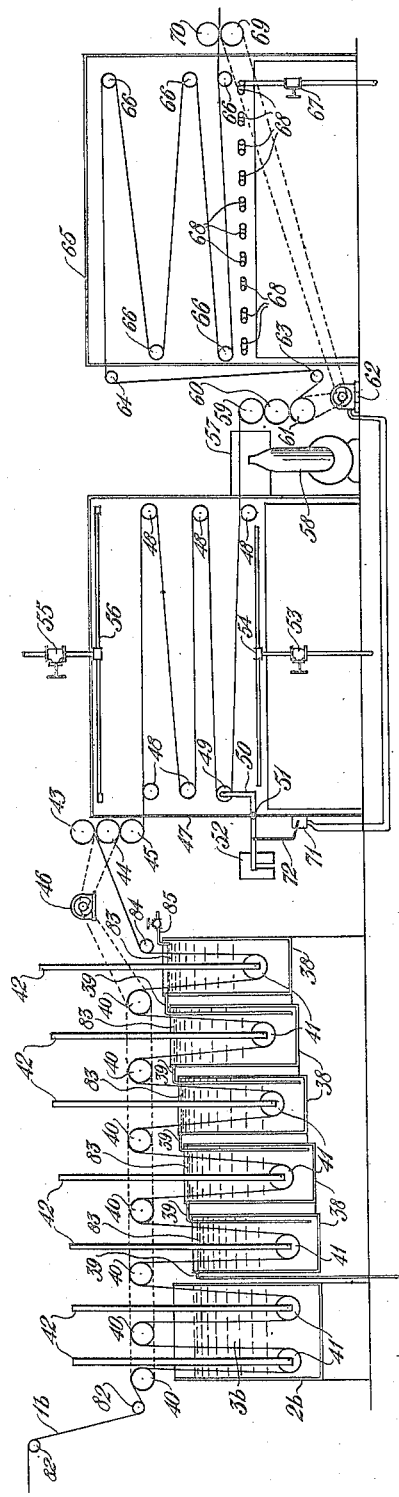

2,364,467

UNITED STATES PATENT OFFICE 2,364,467

CORD AND METHOD AND APPARATUS FOR MAKING SAME

Ralph F. Nickerson, Pittsburgh, Pa., assignor, by mesne assignments, to National Cotton Council of America, Memphis, Tenn., a corporation of Tennessee Application June 27, 1940, Serial No. 342,697

7 Claims. (Cl. 8—132.5)

This invention relates to a new method and apparatus for treating cotton cord or fabric and to the improved products produced, and relates especially to an improved method and apparatus for treating tire cord and fabric to improve the physical properties thereof.

Heretofore it has been known that the breaking strength of a cotton tire cord is increased and the elongation thereof is reduced by severely stretching the cord. Cord produced by such a process of dry-stretching is subject to change, however, since the deformation produced in the cord by the stretching process is not permanent, a certain amount of reversion to the original properties taking place in the cord unless it is kept under tension after the stretching process. Similarly improved breaking strength and lowered elongation result from the application of a "wet-twisting" process, whereby wet cotton yarns are twisted under a high degree of tension to form the cord. Also, the "wet-stretching" process, consisting in wetting a cord with a liquid, presumably water, stretching and then drying, usually under tension, produces a stronger, relatively low-elongation cord.

Although the cords produced by the wet processes are considerably more satisfactory than the older high elongation dry-twisted cord for certain uses, such as for reinforcing automobile tires, they are still inferior to such other cords as high-density rayon tire cords in certain respects. These former cotton tire cords are inferior to rayon tire cords in that they lose considerable breaking strength on complete drying. In other words, the breaking strength at "bone dryness" is considerably lower than the breaking strength of the cords conditioned to normal moisture content. Moreover, the flexing life of a conventional cotton tire cord is markedly inferior to the flexing life of a rayon tire cord.

A primary object of the present invention is to provide an improved method of treating cotton cord or fabric to impart thereto a greatly increased breaking strength and an improved flexing life.

Another object is to provide a method by which the elongation or stretch of a cotton cord is fixed at any desired relatively low value.

Another object is to provide a method for producing a cotton cord having a dense structure and a permanently balanced construction while retaining the property of long flexing life and improved breaking strength.

Another object is to provide an improved cotton cord especially suited for reinforcing rubber articles.

A further object is to provide an improved apparatus for carrying out the process of the invention.

Further objects and advantages of the invention will be apparent from the specification and the accompanying drawings, in which:

Figure 1 is a diagrammatic elevation, partly in section, of apparatus embodying the invention;

Figure 2 is a similar diagrammatic elevation of modified means for heating and tensioning a cord;

Figure 3 is a diagrammatic elevation, partly in section, of another form of apparatus embodying the invention; and Figure 4 is a diagrammatic elevation of a further form of apparatus embodying the invention.

By means of the present invention a cotton cord is produced having a greatly increased breaking strength, which is substantially undiminished at bone dryness. The improved cord also has a much longer flexing life than former cotton cords, especially when it is incorporated in a rubber article such as a tire, fan belt or the like. The improved cord is more uniform in its physical properties, of denser structure and perfectly balanced, so that it has no tendency to twist upon itself.

In all of the foregoing respects the improved cord compares favorably with the best rayon tire cord, but in two further respects it is superior to the rayon cord. Rayon tire cords have stretch values of about 8 to 12 per cent, which is sometimes a disadvantage when these cords are used in reinforcing rubber articles. Such an article tends to grow in size during use, with the result that the structure thereof is weakened and the article tends to wear faster than if no growing had occurred. The preferred type of improved cotton cord has a stretch, measured under comparable conditions of less than 5 per cent and as low as 2 to 3 per cent, if desired. The use of the improved cord in rubber articles prevents them from growing to any appreciable extent. A second advantage of the improved cord over rayon cords is that the natural adhesion of the former to rubber is high, whereas the adhesion of rayon to rubber is so poor that a special adhesive must be utilized when rayon cord is incorporated in a rubber article. In spite of the fact that the improved cotton cord is very dense and smooth, its adhesion to rubber is undiminished from that of the prior art low density, high stretch cord.

Broadly, the process of the present invention involves producing an improved cord by first soaking a conventional cord sufficiently in water to cause substantial swelling of the cord and then plasticizing the soaked cord by heating it under tension. For the soaking step plain water may be used, especially where solvent-extracted fabric or cord is employed or where wet-twisted cord is used which has been manufactured by a process using a wetting agent. When cord or fabric not containing a wetting agent and/or still containing the natural fiber waxes is employed, the soaking bath preferably contains a wetting agent or other substance to reduce the surface tension of the water sufficiently to allow quick and thorough wetting of the cord. As a modification of the usual soaking bath, one containing a calcium combining agent, such as an alkali phosphate, silicate or carbonate, is advantageously employed when the fabric has been produced directly from raw cotton without any boiling, extracting or other chemical treatment.

No matter which modification of the soaking bath is employed, best results are obtained if the temperature of the bath is maintained near room temperature or below, even as low as just above the freezing point of water. The time of soaking should be sufficient for thorough wetting of the cord, and may be as low as a few seconds or as long as desired. It is to be noted that the soaking operation is carried out on the cord or fabric in the absence of any substantial tension thereon, in order that the fibers may absorb the maximum amounts of solution.

The plasticizing operation is preferably accomplished by heating the soaked cord at a temperature above 85° C., and may be effected by the use of temperatures running as high as about 300° C. The cord or fabric may be heated by means of steam or hot water, especially in the lower range of temperatures just indicated. The heating may also be effected by means of some other fluid, which acts merely to transfer heat to the cord, or by a heated solid surface, such as heated rolls or a heated flat surface. Furthermore, the heating may be effected by the direct application of an electric current to the cord, in a manner hereinafter explained. The maximum plasticizing effect is produced at temperatures between about 250° C. and 300° C., although substantial effects are produced at temperatures in the range of 85 to 250° C. The plasticizing operation may include two or more successive treatments of the cord at different plasticizing temperatures, in order to produce a product having specific characteristics more desirable for certain purposes.

It is essential to the success of the process that the cord be under a stretching tension during the plasticizing operation. During the plasticizing and tension treatments the soaked cord stretches at the same time that it tends to swell further. As the cord stretches it collapses laterally and attains a more or less constant length in 3 to 7 seconds. The stretching tension is preferably applied to the cord before it is subjected to the plasticizing treatment in order that the latter treatment may have maximum beneficial effects on the cord.

The stretching tension may be applied to the cord by any known means. Conventional means such as differential speed rolls or the "capstan" stretching rolls, may be utilized for this purpose. Preferably, however, the cord or fabric is uniformly stretched by means of a constant applied stress apparatus, such as the apparatus shown in the drawings and described hereinbelow, which stretches the cord or fabric to any predetermined desired extent, and produces a much more uniform product than is possible by use of means shown in the prior art.

Preferably, as soon as possible after the plasticizing operation the hot cord is chilled with a current of dry air or quenched with cold water. This cooling treatment sets the changes which the preceding steps have induced, thereby producing a cord having its properties changed permanently, so far as ordinary fabric processing is concerned. The time required for this cooling is usually from 2 to 5 seconds for ice-cold water or slightly longer for dry air. Immediately thereafter, the cord is released from the applied tension, unless it is desired to dry the cord under tension.

If the cooled cord is damp, it is now dried, preferably with warm air. If a relatively high stretch is desired, the cord is dried in the absence of any applied tension. If a product with a lower stretch is desired, the cord is dried under tension, the amount of which depends upon the stretch characteristics desired in the final product. As a rule, the higher the tension during the drying operation the lower will be the stretch of the final product. Preferably, the warm air desired for drying the wet cord has a temperature in the vicinity of 40 to 50° C., although shorter drying periods at higher temperatures may be satisfactorily employed.

Referring to the drawings, like numerals designate like parts in the various figures. Figure 1 shows an embodiment of apparatus suitable for treating a single cord according to the invention. The apparatus comprises means for soaking a cord 1, consisting of a tank 2 containing a soaking solution 3. The snub rolls 4, 5, 6 serve to introduce the cord, after it has been soaked, into the plasticizing-tension zone of the apparatus. A direct tension is applied to the cord by means of a pulley 7, which is attached by a support 8 to a lever arm 9, carrying a weight 10. The tension applied to the cord is directly proportional to the weight 10 and the distance of the weight along the arm from a fixed pivot point 11 at one end of the arm. The snub rolls 12, 13, 14, of which roll 12 is motor-driven, serve to pull the cord at a constant rate from the tension zone of the apparatus and to release tension on the cord.

The rate of passage of the cord around the snub rolls 4, 5, 6 is regulated by the position of the lever arm 9, by means of a leather strap 15 fixed at one end 16 and passing in contacting relation around a brake drum 17, which is rigidly attached to one end of the axle 18 of the snub roll 5. The other end 19 of the strap is attached to a flexible wire 20, which passes around a fixed pulley 21 and attaches to the non-pivoting end 22 of the arm 9.

Chambers 23 and 24 serve as means for treating the cord with steam. Directly below the chamber 23 is an electric heater 25 for especial use in plasticizing the cord at higher temperatures. Chamber 26 is placed between the steam chamber 24 and the roll 12 and serves as means to cool the plasticized cord.

Figure 2 shows a modification of the heating means 25 of Figure 1. The modified heating means consists in a hollow metal jacket 27, which may be heated by the circulation therethrough of a hot fluid, such as steam, under pressure if desired.

Figure 3 shows a modification of the apparatus of Figure 1. The apparatus includes only one steam chamber 28, equipped with an inlet pipe 29 for the introduction thereto of low-pressure steam for heating the chamber. A metal pipe 30 passes into the chamber through the wall thereof, around the interior of the chamber and then out of the same through the same wall thereof, and serves to heat the chamber by the circulation of a hot fluid, such as steam under pressure, through the pipe. The cord 1a, entering and leaving the chamber through the top of the same, is held in the chamber under tension by a pulley 31, attached through a support 32 to a weight 10a. The weight carries an arm 33, which is attached by means of a wire 34 to a leather strap 15a, analogous to the strap 15 shown in Figure 1. The strap 15a is in braking contact with a drum 17a, which is rigidly attached to the axle 18a of a snub roll 5a. It is seen that only two braking snub rolls, 5 and 6a are employed in Figure 3, and also only two driven snub rolls, 12a and 13a. A soaking tank 2a, on the left of the steam chamber 28, is entirely analogous to the tank 2 shown in Figure 1. A cooling chamber 35, having the same function as the chamber 26 shown in Figure 1, is horizontally disposed around the plasticized cord. Water may be sprayed into the chamber 35 by means of a perforated pipe 36, extending into the upper part thereof. A pipe 37, in the bottom of the chamber, serves either for carrying off the cooling water from the pipe 36 or for the introduction of a blast of air into the chamber when a water spray is not used. An electric heater 25a is horizontally disposed beneath and in contact with the cord 1a between chambers 28 and 35, and is analogous to the heater 25 shown in Figure 1.

Figure 4 represents diagrammatically apparatus especially suited for the treatment of woven fabric according to the invention. By the use of suitable guides (not shown) weftless cord fabric may be treated according to the invention by means of this apparatus.

The fabric-treating apparatus includes a soaking tank 2b, which is analogous in function to the tank 2 shown in Figure 1. Adjacent the soaking tank is a series of tanks 38, arranged in stepwise relation, each member of the series communicating with the adjacent member on a lower level by means of an overflow tube 39. The fabric 1b is propelled into and through the tanks 2b and 38 by means of motor driven rubber-surfaced rolls 40. The fabric passing through the tanks is maintained without substantial tension below the surfaces of the liquids contained therein by means of divers, each of which essentially consists of a roll 41 attached to an upright arm structure 42 in such a manner that the roll is free to rotate.

The fabric is pulled from the uppermost tank 38 by means of snub rolls 43, 44, 45, roll 44 being driven by the same motor 46 which is used to drive the rolls 40. The fabric passes from the snub roll 45 into a plasticizing chamber 47, equipped with the rolls 48, which are free to rotate and which act to support the fabric and guide it through the chamber. The fabric is maintained under tension in the chamber by a roll 49, around which the fabric is passed. The roll 49 is pressed against the fabric in the direction of the nearest outer wall of the chamber by means of an arm structure 50 on which the roll is mounted. The structure 50 pivots at a point 51 and carries the weights 52 on the outermost portion thereof. A valve 53 connects a source of steam (not shown) to a perforated pipe 54, through which steam may be admitted to the bottom portion of the chamber. Similarly, a valve 55 connects a source of water (not shown) to a perforated pipe 56, from which water may be sprayed into the upper portion of the chamber.

After passing over the bottom roll 48, the fabric leaves the plasticizing chamber and enters the relatively small cooling chamber 57, which is equipped with a blower 58 for directing a blast of cool air against the plasticized fabric. The fabric passes from the cooling chamber around the snub rolls 59, 60, 61, of which the roll 61 is directly driven by the motor 62, and then around the rolls 63 and 64 into a drying chamber 65. The drying chamber is equipped with the rolls 66, which serve to support the fabric and direct its course through the chamber. A valve 67 connects a source of steam (not shown) with a steam coil 68, which is arranged in the lower portion of the drying chamber and serves to heat the same. The fabric is pulled from the drying chamber by means of the rolls 69, 70, of which the roll 69 may be driven by the same motor 62 which is used to drive the snub rolls 59, 60, 61.

The amount of fabric in the plasticizing chamber 47, and hence the position of the roll 49, is maintained at a constant value by means of an arrangement for automatically varying the speed of the motor 62 (and consequently the speed of the snub rolls 59, 60, 61) in accordance with the relative positions of the arm structure 50, which supports the roll 49. The speed of the motor is directly regulated by a speed control means 71, which is, in turn, mechanically controlled by an arm 72 connecting it with the structure 50.

The operation of the apparatus shown in the drawings will now be described with reference to the present process. Referring first to Figure 1, the cord 1 to be treated passes from a supplying spool 73 over a pulley 74 into the soaking solution 3 contained in the tank 2. The cord passes around a pulley 75 within the solution and then out of the tank and over a guide pulley 76. The soaking time of the cord is regulated by the speed of the cord and the height of the solution in the tank. Longer than normal soaking times may be conveniently effected by a suitable arrangement of additional pulleys (not shown) for passing the cord through the solution two or more times.

The soaked cord passes around the braking snub rolls 4, 5, 6 and thence through the first steam chamber 23, past the electric heater 25, and then around the tension pulley 7 and through the second steam chamber 24. Of the three plasticizing means just mentioned, any one may be used alone, or any two may be employed, or all three, if desired. If a steaming means is used, steam is introduced to chambers 23 and/or 24 through pipes 77 and/or 78. If a dry plasticizing means is used, the electric heater 25 is maintained at the desired temperature by the passage of current therethrough; or alternatively, the jacket 27 is kept at the desired temperature by the circulation therethrough of a fluid (such as steam) at the desired temperature. The desired constant tension or stress is applied to the cord by the use of the weight 10 positioned at the proper place on the arm 9. The plasticized and stretched cord is then cooled in the chamber 26 by means of a blast of air introduced thereto through a pipe 79. The cooled cord is pulled through the entire apparatus by means of the driven snub rolls 12, 13, 14 and then wound up on a spool 80 by means (not shown) for winding the cord under tension, or not, as desired.

The cord may be treated by the apparatus shown in Figure 3 in a similar manner. The cord 1a is drawn from a supply spool 73ª through the soaking tank 2a and thence through the braking snub rolls 5a, 6a into the plasticizing chamber 28. The chamber 28 may be heated by means of steam introduced thereto through the pipe 29, and may be further heated by means of the circulation of a hot fluid, such as steam under pressure, through the pipe 30. The cord passes downwardly in the chamber 28 and around the pulley 31, which serves to tension the cord directly by means of the attached weight 10a. From the plasticizing chamber the cord passes around a guide pulley 81 and then in contact with the electric heater 25a. The plasticizing treatment may be applied to the cord by means of the electric heater or the steam chamber 28, or by means of both acting successively on the cord. The plasticized cord is then cooled in the chamber 35, either by means of a spray of water from the perforated pipe 36 or a blast of cool air from the pipe 37. The cooled cord is pulled through the entire apparatus by means of the motor driven snub rolls 12a, 13a and then wound up on a spool 80a by means (not shown) for winding the cord under tension, or not, as desired.

Fabric may be treated in a similar manner according to the process of the invention by means of the apparatus shown in Figure 4. The fabric 1b from a suitable supplying means (not shown) passes over and under guide rolls 82 and then around one of the motor driven rolls 40 into the soaking tank 2b. One or more divers 41, 42, each diver resting freely on the loop of fabric in the tank and between two successive rolls 40, serve to keep the lower portion of the loop uniformly submerged in the soaking solution 3b. The fabric, soaked from its passage through the tank 2b, may then pass over one of the rolls 40 into one or more of the tanks 38, containing a further soaking or rinsing liquid 83. A diver 41, 42 serves to hold a loop of the fabric in each of the tanks 38, in the manner above noted in respect to the tank 2b. The completely soaked fabric leaves the uppermost tank 38, passes over a guide roll 84 and between and around the snub rolls 43, 44, 45, of which the roll 44 may be directly driven by the same motor 46, used to drive the rolls 40. It is to be noted that, in case it is desired not to pass the fabric through any one or all of the tanks 38, the removal of the diver fitting into any one of these tanks allows the fabric to proceed above the tank and supported by the rolls 40.

The fabric proceeds directly from the snub roll 45 into the plasticizing chamber 47. Within the chamber the fabric passes around and over the supporting and guiding rolls 48 and the tension roll 49 to that portion of the chamber adjacent the cooling chamber 57. Tension is applied to the fabric by means of the roll 49, which is supported on one extremity of the arm structure 50. The arm structure pivots at the point 51 and carries the weights 52 at the other extremity thereof, the weights being a direct measure (in addition to other constant but minor factors, such as the drag on the fabric due to friction in the rolls) of the actual stress on the fabric. The plasticizing chamber is directly heated by means of steam introduced thereto by means of the perforated pipe 54.

The plasticized fabric passes from the chamber 47 into the cooling chamber 57 wherein it is cooled by a blast of air projected against it by the blower 58. The cooled fabric leaves the chamber 57 and passes around and between the snub rolls 59, 60, 61, of which the roll 61 is directly driven by the motor 62. Then the fabric proceeds around the guide rolls 63 and 64 into the drying chamber 65, which may be heated by the steam coil 68. Within the drying chamber the fabric passes back and forth around and over the supporting and guiding rolls 66 to the exit portion of the chamber. From the drying chamber the fabric passes between the co-acting rolls 69, 70, of which the roll 69 may be directly driven by the same motor 62 used to drive the snub rolls 59, 60, 61. Thence, the processed fabric proceeds to a suitable windup or subsequent processing means (not shown).

During the plasticizing treatment the cord or fabric is preferably maintained under a substantially uniform tension or stress by a suitable means, such as one of those hereinbefore described in the discussion of the apparatus shown in Figures 1, 3, and 4. Although the specific means herein disclosed consists essentially of an arrangement for the application of a direct weight to the cord or fabric, other means for applying a substantially uniform tension to a moving portion of cord or fabric are contemplated as being within the limits of the invention. The automatic means shown in the drawings for maintaining a substantially constant length of cord or fabric exposed to the uniform tensioning means is not absolutely essential to the proper functioning of the apparatus, but it is a substantial aid to the smooth functioning of the apparatus.

In order to explain the invention more fully, various examples are given hereinbelow relating to the treatment of cotton tire cord or fabric. The improvement in the physical properties of the cord due to the treatment according to the invention is indicated in part by comparisons of the measured breaking strengths, and, in some cases, the stretch values shown under a 10 pound load, the cord being either in a condition of "bone dryness" or conditioned to have a normal moisture content of about 6.5 to 7 per cent when the tests were made. Each of the numerical values shown in the examples is the average of at least 15 experimental values obtained on various portions of a given sample of a cord. The variation in the values shown for the untreated cord is perfectly normal for cotton tire cord. This variation may be at least partly explained by the fact that a cotton cord is no a completely uniform arrangement of its component fibers.

EXAMPLE 1

A standard cotton tire cord (21/5/3, No. 9 K. P. wet twist) was treated according to the invention in an apparatus similar to that shown in Figure 1. The soaking bath 3 consisted of a 0.3 per cent aqueous solution of a commercial wetting agent, Tergitol 7 (sodium salts of the half acid sulfates of branched chain aliphatic alcohols having carbon contents in the range of $C_{12}$ to $C_{20}$). The cord was soaked in this solution at 30° C. for varying times, as is indicated in Table 1, and then was steamed at 98° C. in the chambers 23 and 24 for 1 minute. The electric heater was not utilized. During the steaming the cord was maintained under a tension of 8 pounds by properly adjusting the weight 10 on the arm 9. The steamed cord was air-cooled in the chamber 26 and then wound on the windup spool 80 in the absence of appreciable tension. The cord was first air-dried and then dried in an oven to bone dryness before the data shown in the following Table 1 were obtained.

TABLE 1

| Soaking time in seconds | Bone dry breaking strength in lbs. | | Relative strength in per cent | Bone dry per cent stretch (10 lbs.) | | Relative stretch in per cent |
|---|---|---|---|---|---|---|
| | Untreated | Treated | | Untreated | Treated | |
| 15 | 16.09 | 23.38 | 145 | 9.94 | 4.59 | 46 |
| 30 | 16.14 | 23.03 | 143 | 10.28 | 4.95 | 48 |
| 60 | 16.18 | 23.10 | 143 | 10.33 | 4.72 | 46 |

Thus, it is seen that the breaking strength of the cord has been improved by approximately 45 per cent by the process of the invention, and, at the same time the stretch under a heavy load has been reduced to approximately 46 per cent of the original value.

Further experiments have shown that substantially equivalent results are obtained when the soaking time is increased to various values ranging from 1 to 5 minutes. Other experiments have shown that equivalent results are also obtained on soaking the cord for shorter times than are shown in Table 1. In fact, it has been ascertained that sufficient wetting is effected by eliminating the use of the soaking tank and merely applying a jet of the soaking solution to the moving cord before tension is applied to the same in connection with the steam-tension step of the process.

No wetting agent need be added to the soaking solution if the cord being treated has previously been extracted with a solvent to remove the natural cotton waxes or if the cord contains a small amount of wetting agent, as in the case of some wet-twisted cords. For the soaking of ordinary cotton cords other wetting agents have been employed in lieu of Tergitol 7, and wetting agent concentrations ranging from 0.1 per cent to 1.0 per cent have been used to produce results as satisfactory as those shown in Table 1 for the treated cords.

EXAMPLE 2

Cotton tire cords (1⅝ inch staple, 12/4/2 K. P. wet twist) were processed identically and in the manner set forth in Example 1, except that the temperature of the soaking solution was varied in order to determine the effect of such variation on the properties of the treated cords. The untreated control cord possessed a conditioned (7 per cent moisture) breaking strength of 20.5 pounds. The data obtained on the treated cords are shown in Table 2.

TABLE 2

| Temperature of soaking solution | Conditioned breaking strength in pounds | Relative strength of treated to untreated cord in per cent |
|---|---|---|
| 100° C | 22.7 | 111 |
| 80° C | 22.9 | 112 |
| 50° C | 23.2 | 113 |
| 40° C | 23.3 | 114 |
| 20° C | 23.7 | 116 |
| 0° C | 23.8 | 116 |

The rise in strength as the bath temperature is lowered is quite apparent. For practical reasons, a soaking temperature of less than 50° C. is preferred in order to produce maximum benefits in the treated cord.

EXAMPLE 3

Raw cotton tire cord was treated in a manner similar to that described in Example 1, except that in certain cases a water soluble calcium-combining agent was added to the soaking solution to modify the alkaline earth pectates contained in the cord, prior to the plasticizing step. Table 3 gives the average breaking strengths of cords (conditioned to 7 per cent moisture) treated with various calcium-combining agents in addition to the regular process.

TABLE 3

| Per cent of calcium combining agent in soaking bath | Average conditioned breaking strength in pounds | Relative strength of treated to untreated cord in per cent |
|---|---|---|
| Untreated control cord | 20.0 | |
| None | 23.6 | 118 |
| 1% sodium sulfite | 24.2 | 121 |
| 1% sodium carbonate | 24.3 | 122 |
| 1% trisodium phosphate | 24.5 | 123 |
| 0.6% sodium hexametaphosphate | 24.3 | 122 |
| 5% sodium silicate (water glass) | 24.5 | 123 |
| 3% sodium silicate | 24.2 | 121 |
| 1% sodium silicate | 23.8 | 119 |

Table 3 shows that the beneficial effects of certain calcium-combining agents are appreciable. Obviously other calcium-combining (calcium-precipitating) reagents in the proper concentrations would accomplish the same results.

It is to be noted that an increase of 20 per cent in the conditioned breaking strength of a cord treated according to the invention corresponds to an increase of about 45 per cent in the bone dry breaking strength.

EXAMPLE 4

Cotton tire cord of the type employed in Example 1 was treated in the same manner, except that the soaking time was 30 seconds and the time for plasticizing by steaming was varied. Bone dry breaking strengths and stretch values are shown in Table 4.

TABLE 4

| Steaming time in seconds | Bone dry breaking strength in lbs. | | Relative strength in per cent | Bone dry per cent stretch (10 lbs.) | | Relative stretch in per cent |
|---|---|---|---|---|---|---|
| | Untreated | Treated | | Untreated | Treated | |
| 0 | 14.64 | 18.76 | 128 | 10.81 | 7.68 | 71 |
| 18 | 14.66 | 21.14 | 144 | 10.72 | 4.85 | 45 |
| 30 | 14.27 | 21.11 | 148 | 10.64 | 4.13 | 39 |
| 60 | 14.78 | 22.00 | 149 | 12.08 | 3.05 | 25 |
| 120 | 14.46 | 22.17 | 153 | 11.95 | 3.60 | 30 |

The data in Table 4 show that a great improvement in properties of the cord is obtained on steaming for only 18 seconds, with slightly greater improvements when the steaming time is extended to a minute or two. It is to be noted that a tension of 8 pounds was applied to all cords represented in Table 4 after the soaking treatment, whether they were steamed or not.

EXAMPLE 5

Cotton tire cord of the type specified in Example 1 was subjected to the process of the invention by means of apparatus similar to that shown in Figure 3. The cord 1a was soaked for 30 seconds in the solution 3a, which consisted of a 0.3 per cent aqueous solution of Tergitol 7 maintained at a temperature of 30° C. The soaked cord was plasticized for 30 seconds in the chamber 28 at various temperatures ranging from 65° C. to 120° C. in order to determine the lowest practicable temperature for heat-treating the cord. The lower temperatures were obtained by introducing just sufficient low pressure steam to the chamber through the pipe 29 to maintain the desired temperature in the chamber. The highest temperature was obtained by circulating steam under pressure through the pipe 30 and, at the same time passing low pressure steam into the chamber through the pipe 29. During the steaming of the cord a tension of 8 pounds was applied thereto by means of the pulley 31 and the attached weight 10a.

The steamed cord passed directly to the cooling chamber 35, the electric heater 25a not being utilized. The cord was chilled in the cooling chamber by means of a blast of air from the pipe 37, and was thereafter wound up on the spool 80a, in the absence of appreciable tension. The cord was dried in the manner described in Example 1 before the comparative data shown in Table 5 were obtained.

TABLE 5

| Steam temperature | Bone dry breaking strength in lbs. | | Relative strength in per cent | Bone dry per cent stretch (10 lbs). | | Relative stretch in per cent |
|---|---|---|---|---|---|---|
| | Untreated | Treated | | Untreated | Treated | |
| 65° C | 16.03 | 20.70 | 120 | 10.11 | 9.23 | 91 |
| 85° C | 16.22 | 21.51 | 133 | 10.17 | 6.90 | 68 |
| 98° C | 16.10 | 23.03 | 143 | 10.14 | 5.35 | 53 |
| 120° C | 15.96 | 23.20 | 145 | 10.27 | 4.68 | 46 |

Table 5 indicates that steaming (heat treating) temperatures above 85° C. are desirable for producing maximum benefits. Other experiments have demonstrated that hot water can be substituted for steam in the present process with practically equivalent results, the plasticizing chamber 28 being preferably enlarged so as to include within it all of the support 32, the weight 10a, the arm 33 and the lower portion of the wire 34. Further experiments have shown that the hot, plasticized cord may be successfully cooled in the chamber 35 by means of a spray of water from the pipe 36, the resulting finished cord being equivalent to the cords, already described, which were cooled by an air blast.

EXAMPLE 6

Cotton tire cord (21/5/3, No. 9 K. P. wet twist) was treated in a manner similar to the processes of the prior examples, except that the tension on the cord during the steaming operation was varied among the samples treated. The bone dry breaking strengths and stretch values for the treated cords are compared with corresponding values for the corresponding untreated cords in Table 6.

TABLE 6

| Tension on cord in pounds | Bone dry breaking strength in lbs. | | Relative strength in per cent | Bone dry per cent stretch (10 lbs). | | Relative stretch in per cent |
|---|---|---|---|---|---|---|
| | Untreated | Treated | | Untreated | Treated | |
| 2 | 16.95 | 17.82 | 105 | 9.63 | 8.80 | 91 |
| 4 | 16.60 | 18.93 | 114 | 9.33 | 8.03 | 86 |
| 6 | 16.73 | 20.63 | 123 | 9.56 | 6.45 | 67 |
| 8 | 16.53 | 22.68 | 137 | 8.88 | 5.17 | 58 |

The application of tensions in excess of 8 pounds produces cords having proportionately higher strengths and lower stretch values. However, the use of tensions much greater than 50 to 60 per cent of the breaking strength of the untreated cord introduces the danger of cord breakage during the treatment, especially when fabric is being employed instead of single cords.

The cords produced according to this example were also tested on the "snap cycle" flexing apparatus described and claimed in United States Patent No. 2,157,092. The flexing lives of the cords, in terms of the average of the total number of flexes of 24 cords per sample and also in terms of the relative flexing lives of the treated to the corresponding untreated cords in per cent, are shown in Table 7. The data in this table disclose that the flexing life of a cord treated according to the method of the invention is substantially improved. The extremely long flexing life of the cord treated under 8 pounds of tension is noteworthy.

TABLE 7

| Tension on cord in pounds | Snap cycle flexing in actual flexes | | Relative flexing life in per cent |
|---|---|---|---|
| | Untreated | Treated | |
| 2 | 3,000 | 3,540 | 118 |
| 4 | 2,710 | 4,670 | 172 |
| 6 | 3,100 | 5,860 | 189 |
| 8 | 2,750 | 7,600 | 276 |

EXAMPLE 7

A standard cotton tire cord (21/5/3, No. 9 K. P. wet twist) was treated in an apparatus similar to that shown in Figure 3 in a manner similar to the processes of the prior examples, the cord being plasticized under a tension of 6 pounds. The cord, after having been steamed in the chamber 28 at approximately 100° C., was then subjected to various temperatures by contact with the electric heater 25a for 5.5 seconds at various temperatures from 120° C. to 290° C. The cord was thereafter cooled and conditioned to the normal moisture content in the usual manner, before the data shown in Table 8 were obtained.

TABLE 8

| Temperature of electric heater | Conditioned breaking strength | Relative strength of treated to untreated cord in per cent |
|---|---|---|
| (a) | 18.63 | (a) |
| (b) | 21.33 | 114 |
| 120° C | 21.93 | 118 |
| 160° C | 21.29 | 114 |
| 200° C | 21.12 | 113 |
| 240° C | 19.93 | 107 |
| 270° C | 21.96 | 118 |
| 290° C | 22.43 | 120 | a—Untreated control cord.
b—Cord soaked and steamed but not heated by electric heater.

It is evident from Table 8 that a further plasticization of the soaked and steamed cord at the higher temperatures of 120° C., 270° C. and 290° C. further increases the strength of the cord. Even though the strengths fall off for the heater temperatures of 160°–240° C., they are substantially higher than the strength of the untreated control cord.

In addition to having a higher strength than the soaked and steamed cord, the cord additionally heated at the higher temperatures has a lower stretch.

Table 9 shows bone dry strength and stretch values obtained on a cord treated in the same manner as the cords reported in Table 8, the electric heater being at 270° C. Table 9 also shows the snap cycle flexing values obtained on the cord in the manner set out in Example 6 hereinabove.

TABLE 9

| Type of cord tested | Bone dry breaking strength in pounds | Relative strength in per cent | Bone dry per cent stretch (10 lbs.) | Relative stretch in per cent | Snap cycle flexing | |
|---|---|---|---|---|---|---|
| | | | | | Actual flexes | Per cent |
| Untreated | 14.20 | 100 | 8.47 | 100 | 2,190 | 100 |
| Treated | 20.45 | 144 | 2.73 | 32 | 5,540 | 253 |

The extremely low stretch of the treated cord shown in Table 9 is at least partly explained by the fact that the cord is completely dried by the electric heater while the cord is under tension.

EXAMPLE 8

A standard cotton tire cord (12/4/2, K. P. wet twist) was treated in an apparatus similar to that shown in Figure 1, the plasticization being effected by the electric heater 25 and the steaming chamber 24. The cord was first soaked in the manner heretofore indicated in the tank 2 and then passed under tension in contact with the heater 25. The dry-heated cord was steamed in the manner heretofore indicated in the chamber 24 and then cooled by an air blast in the chamber 26. The cooled cord was collected and conditioned to a normal moisture content before the data shown in Table 10 were obtained.

TABLE 10

| Temperature of heater | Tension in pounds during plasticization | Conditioned breaking strength in pounds | Relative strength in per cent |
|---|---|---|---|
| (¹) | (¹) | 19.76 | (¹) |
| 100° C | 6 | 23.70 | 120 |
| 100° C | 8 | 24.22 | 123 |
| 275° C | 6 | 24.40 | 123 |
| 275° C | 8 | 25.49 | 129 |

¹ Untreated control cord.

It is evident from Table 10 that plasticization by a treatment of the cord with dry heat followed by moist heat produces highly beneficial effects in the cord, the effects being quite comparable with those shown in Table 8, wherein the two plasticizing means were applied in the reverse order. Moreover, Table 10 shows that a given increase in breaking strength can be obtained by treating the cord at a higher temperature under less tension than is required at a lower temperature. From a practical point of view this variation in plasticity with temperature is important because it permits the use of lower operating tensions, and consequently, reduces the danger of cord breakage during the treatment.

EXAMPLE 9

A cotton tire cord was soaked and then steamed in the usual manner heretofore described in apparatus similar to the apparatus shown in Figure 3. However, in this case the electric heater 25a was replaced by means (not shown) such as two opposing condenser plates on opposite sides of the cord and in contacting relation thereto, for heating the steamed cord by the direct application thereto of an alternating electric current. The electrically heated cord was cooled in the chamber 35 and then collected and conditioned to a normal moisture content. Table 11 shows a comparison of this cord with one treated without the electrical heating.

TABLE 11

Conditioned breaking strength in pounds

| With electrical heating | Without electrical heating |
|---|---|
| 22.41 | 21.53 |

It is evident from Table 11 that the use of direct electrical heating produces an increase in strength of the cord of the same order as the increases above noted by the use of high temperature surface means. An advantage of direct electrical heating is that the cord will not become overheated, since the conductivity of the cord, and hence the amount of heat generated in the same, decreases as its moisture content decreases.

EXAMPLE 10

Conventional woven cotton tire cord fabric with a total of 100 ends of a 21/5/3 cord (10 ends per inch) was treated in an apparatus similar to that shown in Figure 4. The fabric was soaked for 1 minute in a 0.3 per cent solution of Tergitol 7 (3b) contained in the tank 2b and then passed directly to the snub rolls 44, 45, 46 by means of the rolls 40, the divers 41, 42 being absent from the tanks 39. The fabric was steamed for 80 seconds in the chamber 47 at 98° C. under a tension of approximately 7.5 pounds per cord by means of a direct load of 750 pounds (as the weights 52). The hot fabric was cooled in the chamber 57 by the air blast 59 and then dried in the absence of appreciable tension in the chamber 65. The average breaking strengths and stretch values obtained on cords taken from the treated fabric are given in Table 12, together with comparative values for cords from the untreated fabric.

TABLE 12

| | Treated | Untreated |
|---|---|---|
| Conditioned (6.5% regain) breaking strength in pounds | 21.90 | 19.24 |
| Conditioned per cent stretch (10 pound load) | 4.30 | 10.87 |
| Bone dry breaking strength in pounds | 20.14 | 15.76 |
| Bone dry per cent stretch (10 pound load) | 4.23 | 9.37 |

Thus, it is apparent that beneficial effects are produced by applying the present process to woven tire fabric as well as to the single cords.

The stretch of the final product of the present process is dependent on the amount of tension applied to the cord during the treatment with steam or hot water. As it has been indicated hereinabove, extremely low stretch characteristics (with accompanying slightly higher breaking strengths) can be obtained by drying the processed cord under tension, the greater the tension, the lower the stretch in the dried product. It should also be noted that the main practical advantage of the cooling or quenching step after the heat-tension treatment is to set the instantaneous physical characteristics which have been produced in the prior steps, in order to provide a greatly improved cord having substantially permanent good properties. In addition, the cooling or quenching step helps the production of more uniform products by standardizing the cooling of the cord.

Although it has been indicated hereinabove that drying temperatures in the range of 40 to 50° C. are preferred, satisfactory results have been obtained with drying temperatures ranging up to approximately 120° C. This statement may seem to be a contradiction of what has already been said but, in reality, it is not. The physical changes produced in the cord by the novel swelling-plasticizing-tension treatment are subsequently maintained during the drying of the cord by relatively small stresses, even under severe conditions. The effect is entirely compatible with the elastic relaxation which has taken place. In other words, the beneficial effects of the present process on the characteristics of cotton cord are not lost under conditions of ordinary tire fabric processing.

In addition to increased breaking strength and low elongation or stretch, the novel cord produced by the present process possesses a remarkably long flexing life, determined either on the cord itself or in reinforced rubber structures. The combination of high strength, costrollable low stretch and long flexing life constitutes the new cord as eminently suited for reinforcing automobile tires, fan belts and other rubber-fabric structures. In addition to possessing these bare properties the new cord retains these properties substantially unchanged during normal fabric processing and tire building conditions, unlike many of the tire cords of the prior art, which tended to lose substantial amounts of their properties on being heated or latex-dipped, etc. Moreover, it has been ascertained that the adhesion of the new cord to vulcanized rubber is fully as satisfactory as the adhesion of untreated cotton cord. Another characteristic of the new cord which makes it and fabric including it easier to handle is its complete freedom from an unbalanced twist, so common in prior art tire cords. After the present process has been completed, the various twists in the cord are completely set, so that there is no tendency for the cord to unwind or to twist upon itself.

It has been found that no additional benefits are obtained by giving cord or fabric more than a single treatment according to the present method, assuming that all conditions of a subsequent treatment are identical to those of the first treatment.

The water soaking bath or solution may contain a cotton lubricating agent such as a soap, an emulsion of a high melting wax, or another lubricating material, instead of, or in addition to the other substances hereinbefore specified for adding to the solution. The lubricating agent is taken up by the cotton cord during wetting of the latter prior to the step of steaming under tension. In comparison with the treated cords hereinabove described, the lubricated and treated cord has a substantially improved flexing life and may have an improved breaking strength, the latter characteristic depending on the specific lubricating agent employed.

It has been established that the bonding of the fibers in the cord through the agency of natural waxes and gums does not occur in this process. The present process operates effectively on cord which has been carefully freed from waxes and gums (pectates). Cotton tire cord, dewaxed by solvents and freed of pectate, gave an average tensile strength increase of 3.43 pounds when processed, as against 4.06 pounds for a similarly processed raw cord. The explanation of the beneficial effects produced by the present process, therefore, must lie in the rearrangement of the fibers of the cord to form a more compact structure, and not in a mere sticking together of the fibers by means of natural adhesives occurring in the cotton. The present process is applicable to cords produced from short staple cotton as well as to cords produced from long staple cotton. By operation of the present process on short staple cotton cord a produce comparing favorably with the conventional cotton cord of long staple is produced. However, it should be appreciated that the product produced by the present invention from long staple cotton cord is without equal in the prior art.

The twist of the improved cord of the invention is substantially the same as the twist of the untreated cord from which the improved cord is derived. Of course, the twist of the improved cord is usually slightly less, to a varying degree, than the twist of the corresponding untreated cord, depending on the characteristics of the untreated cord and the amount of tension applied to the cord during the treatment of the invention. However, the twist of the improved cord has been found to be substantially the same as the twist of a corresponding conventional wet twist cord.

The preferred improved cord of the present invention, some of the properties of which are set forth in certain of the above examples, possesses a bone dry breaking strength of more than 135 per cent and a snap cycle flexing life of more than 200 per cent as compared with the corresponding properties of a corresponding conventional wet twist cord of substantially the same construction as to staple length, singles weight and twist. It has been found that the preferred cord is unique in the improved performance of rubber articles, such as tires, reinforced by it, in comparison with rubber articles reinforced with former cotton cords.

Throughout the specification and in the appended claims the term "cord" is used generically to refer to twisted structures made up of one or more yarns or plies, and includes other cords than the singles-ply-cable construction shown in the examples, such as, for example, conventional tire cords of 23/5/3 construction or a rovings cord of, for example a 5/2 construction. Furthermore, "cord" is meant to cover generically either single end cords or fabric, with or without weft threads, the warp of which is made up of single end cords.

The invention described in detail in the examples and other portions of the specification is ment to be construed as broadly as possible in view of the prior art and as measured by the appended claims.

What is claimed is:

1. A method of producing a rubber reinforcing cord having an improved flexing life comprising wetting a cotton cord at a temperature below 50° C. in the absence of substantial tension on the cord by treating the cord with a soaking bath comprising a water solution of a wetting agent and substantially free of bonding agents, applying a stretching tension to the cord, and subjecting the wet stretched cord to steam having a temperature above 85° C., cooling the cord while maintaining it under tension, and then releasing the stretching tension from the cord and drying the cord.

2. A method of producing a rubber reinforcing cord having an improved flexing life comprising wetting a cotton cord at a temperature below 50° C. in the absence of substantial tension on the cord by treating the cord with a soaking bath of water substantially free of bonding agents, applying a stretching tension to the cord, and subjecting the wet stretched cord to steam having a temperature above 85° C., cooling the cord while maintaining it under tension, and then releasing the stretching tension from the cord and drying the cord.

3. A method of producing a rubber reinforcing cord having an improved flexing life comprising wetting a cotton cord at a temperature below 50° C. in the absence of substantial tension on the cord by treating the cord with a soaking bath of water substantially free of bonding agents, applying a stretching tension to the cord and subjecting the wet cord to a temperature between 250° and 300° C., and then cooling the cord while maintaining it under tension.

4. A method of producing a rubber reinforcing cord having an improved flexing life comprising wetting a cotton cord at a temperature below 50° C. in the absence of substantial tension on the cord by treating the cord with a soaking bath of water substantially free of bonding agents, applying a stretching tension to the cord and subjecting the wet cord to a temperature above 85° C. by contact thereof with a heated surface, and then cooling the cord while maintaining it under tension.

5. A method of producing a rubber-reinforcing cord having an improved flexing life comprising wetting a cotton cord at a temperature below 50° C. in the absence of substantial tension on the cord by treating the cord with a soaking bath of water substantially free of bonding agents, applying a stretching tension to the cord and subjecting the wet cord to a temperature above 85° C. by passing an alternating electric current through the cord, and then cooling the cord while maintaining it under tension.

6. A method of producing a rubber-reinforcing cord having an improved flexing life comprising wetting a cotton cord at a temperature below 50° C. in the absence of substantial tension on the cord by treating the cord with a soaking bath of water substantially free of bonding agents, applying a stretching tension to the cord and subjecting the wet cord to a temperature above 85° C., and then cooling the cord while maintaining it under tension.

7. Apparatus for treating cotton cord which comprises means for soaking a cord, means adjacent said soaking means for snubbing said cord, means for propelling said cord, means for applying a substantially uniform tension to said cord, automatic control means acting on the snubbing means and tensioning means to maintain a substantially constant length of said cord under the substantially uniform tension, means for releasing the stretching tension from the cord, and means for winding up the cord.

RALPH F. NICKERSON.